(12) United States Patent
Hart et al.

(10) Patent No.: US 9,323,970 B2
(45) Date of Patent: Apr. 26, 2016

(54) TRADING INTERFACE RETRIEVED BASED UPON BARCODE DATA

(71) Applicant: TD Ameritrade IP Company, Inc., Omaha, NE (US)

(72) Inventors: John E. Hart, Chicago, IL (US); William J. Shea, Jersey City, NJ (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 14/364,041

(22) PCT Filed: Dec. 6, 2012

(86) PCT No.: PCT/US2012/068258
§ 371 (c)(1),
(2) Date: Jun. 9, 2014

(87) PCT Pub. No.: WO2013/090119
PCT Pub. Date: Jun. 20, 2013

(65) Prior Publication Data
US 2014/0353371 A1   Dec. 4, 2014

Related U.S. Application Data

(60) Provisional application No. 61/570,199, filed on Dec. 13, 2011.

(51) Int. Cl.
*G06K 7/14* (2006.01)
*G06F 17/30* (2006.01)
*G06Q 40/04* (2012.01)

(52) U.S. Cl.
CPC ............. *G06K 7/1408* (2013.01); *G06F 17/30* (2013.01); *G06F 17/30879* (2013.01); *G06Q 40/04* (2013.01)

(58) Field of Classification Search
CPC .................................................... G06K 7/1408
USPC ................................................ 235/375, 380
See application file for complete search history.

(56) References Cited

U.S. PATENT DOCUMENTS

2007/0011087 A1* 1/2007 Waris .............................. 705/39
2007/0033136 A1   2/2007 Hu
(Continued)

FOREIGN PATENT DOCUMENTS

JP          08-077245        3/1996
JP          2002-092532      3/2002
KR          10-2007-0025415  3/2007

OTHER PUBLICATIONS

Notification of Transmittal of the International Search Report and The Written Opinion of the International Searching Authority, for PCT/US2012/062858, dated Mar. 11, 2013, 8 pages.
(Continued)

*Primary Examiner* — Allyson Trail
(74) *Attorney, Agent, or Firm* — Foley & Lardner LLP

(57) ABSTRACT

Methods, systems, and apparatuses, including computer programs encoded on computer-readable media, for receiving barcode data including a company identifier. The company identifier is determined from the barcode data. A company name is determined based upon the company identifier. One or more associated company names associated with the manufacturer are determined based upon the company name. Based upon the company name, a ticker symbol is determined. In addition, one or more ticker symbols based upon the one or more associated company names are determined.

25 Claims, 6 Drawing Sheets

(56) References Cited

U.S. PATENT DOCUMENTS

| | | |
|---|---|---|
| 2007/0043651 A1 | 2/2007 | Xiao et al. |
| 2007/0185810 A1* | 8/2007 | Kalra et al. ............... 705/40 |
| 2008/0052230 A1 | 2/2008 | Crane et al. |
| 2009/0259547 A1* | 10/2009 | Clopp ............... 705/14.16 |
| 2010/0057608 A1 | 3/2010 | McPherson |
| 2010/0262600 A1* | 10/2010 | Dumon et al. ............ 707/725 |
| 2011/0040665 A1* | 2/2011 | Long ............... 705/35 |
| 2011/0238454 A1 | 9/2011 | Nestor et al. |
| 2011/0238555 A1* | 9/2011 | Rosenthal ............... 705/37 |
| 2012/0190386 A1 | 7/2012 | Anderson |
| 2012/0203681 A1* | 8/2012 | Lele et al. ............... 705/37 |
| 2012/0233089 A1 | 9/2012 | Calman et al. |

OTHER PUBLICATIONS

Chappy_02, E Trade Digital Ideas, Investing Unleashed Digital Apps for Mobile Investment Screening, Jan. 10, 2011, 16 pages, URL http://www.slideshare.net/Chappy_02/e-trade-digital-ideas.

* cited by examiner

150

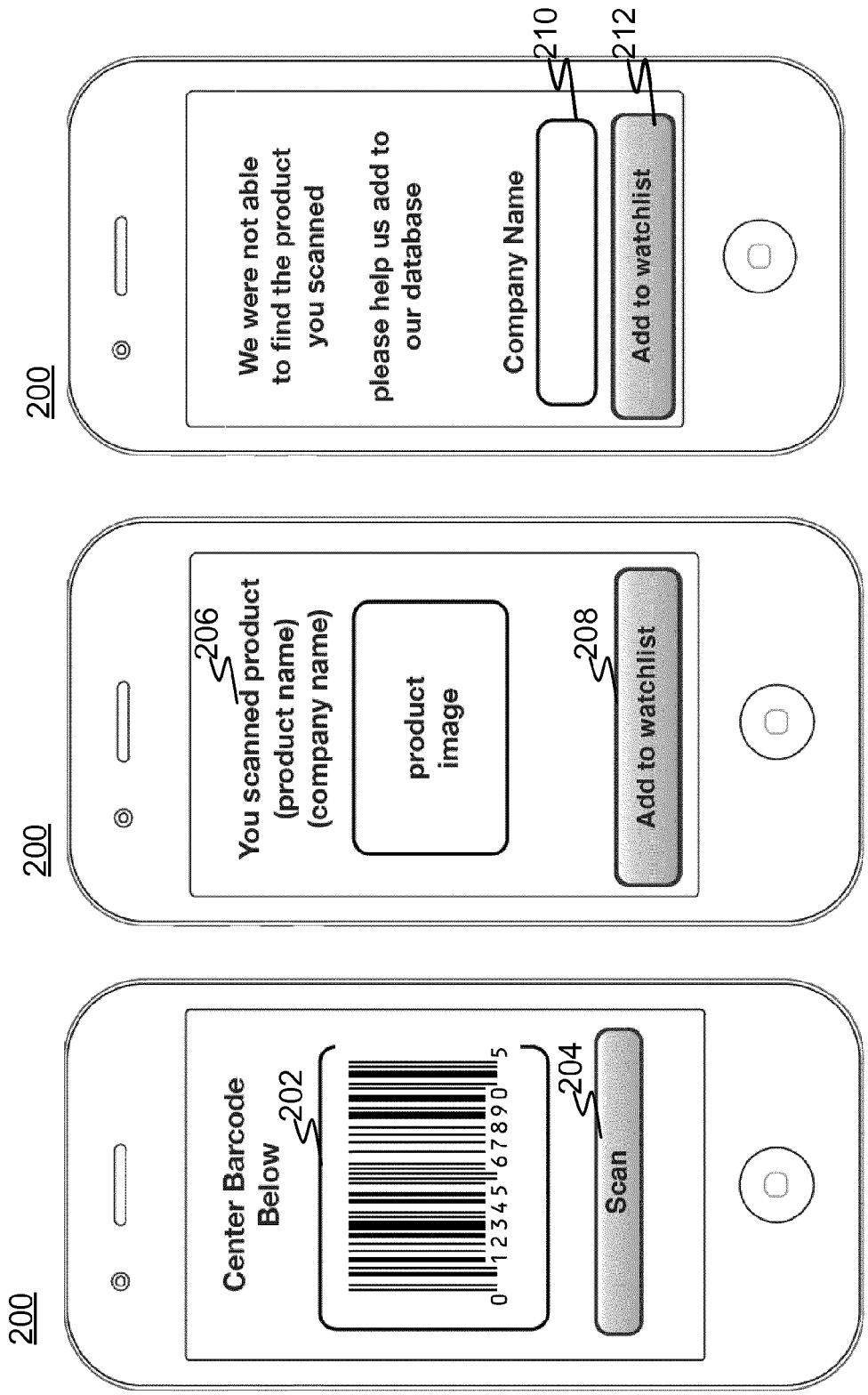

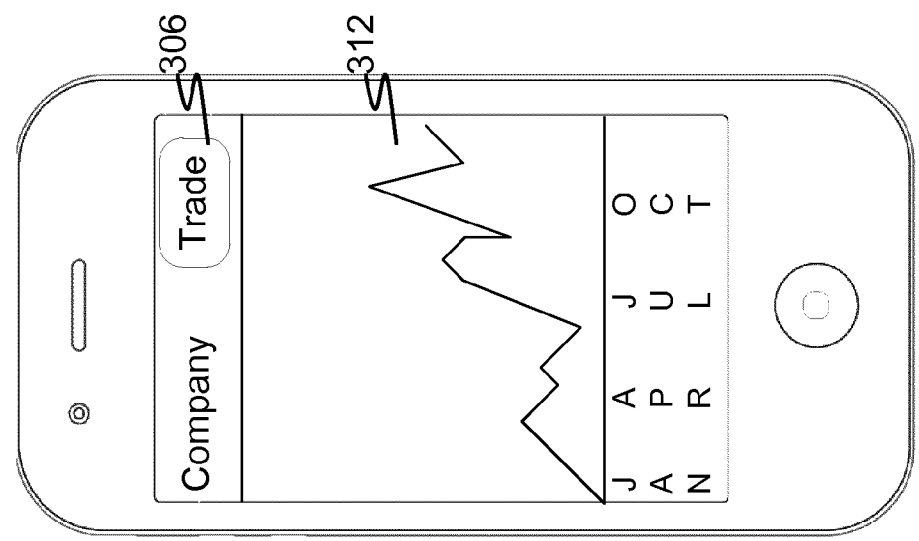

TRADING INTERFACE RETRIEVED BASED UPON BARCODE DATA

CROSS-REFERENCE TO RELATED PATENT APPLICATIONS

This application is a U.S. National Phase application of PCT/US2012/068258 filed Dec. 6, 2012, which claims the benefit of U.S. Provisional Application No. 61/570,199, filed Dec. 13, 2011, all of which are incorporated herein by reference in their entirey.

BACKGROUND

Universal product codes (UPCs) are a type of barcode used to track items in various stores. There are various formats for UPCs. FIG. 1A illustrates a UPC-A version UPC that includes twelve digits. The twelve digits include eleven identifying digits and one check digit. The UPC 100 includes a company prefix 106 that is made up of 6, 7, 8, or 9 digits from the identifying digits. The company prefix 106 identifies a company, such as, but not limited to, a manufacturer, producer, supplier, etc. For UPCs that are used in various stores, the company prefix 106 is assigned by a third party to ensure the various company prefixes are unique. A product number 110, which comprises the remaining identifying digits, is used by a company to identify the product associated with a UPC. Companies can use the product number 110 in various ways to identify the associated product. The UPC 100 also includes a check digit 114 that can be used to verify the identifying digits are valid. To help scanning UPCs, the UPC 100 includes guard bars 104, 108, and 112, that separate the company prefix 106, the product number 110, and the check digit 114.

The guard bars 104, 108, and 112 help barcode scanners to read barcodes. Barcode scanners are electric devices that include a light source, a lens, and a light sensor. The light sensor translates optical impulses into binary information. A barcode scanner can also include a decoder that analyzes the light sensor data to decode the data encoded in the barcode into barcode data. The barcode data can be sent to various other devices through an output port on the barcode scanner.

Various other forms of barcodes exist, such as a two-dimensional barcode. One example of a two-dimensional barcode is a quick response code (QR code). QR codes are capable of storing a large amount of data compared with one-dimensional barcodes. For example, a QR code can encode 4,296 alphanumeric characters. FIG. 1B illustrates a QR code 150. The QR code 150 includes three position patterns 152 and an alignment pattern 154 that are used in scanning the QR code 150 and decoding its data. The data of a QR code is encoded in a data area 156.

SUMMARY

In general, one aspect of the subject matter described in this specification can be embodied in methods for receiving barcode data including a company identifier. The company identifier is determined from the barcode data. A company name is determined based upon the company identifier. One or more associated company names associated with the manufacturer are determined based upon the company name. Based upon the company name, a ticker symbol is determined. In addition, one or more ticker symbols based upon the one or more associated company names are determined. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-2C are illustrations of a trading interface retrieved based upon a UPC in accordance with an illustrative implementation.

FIGS. 3A-3C are illustrations of a trading interface retrieved based upon a UPC in accordance with an illustrative implementation.

Like reference numbers and designations in the various drawings indicate like elements.

DETAILED DESCRIPTION

Figure 1A:
FIG. 1A illustrates a UPC-A version UPC.
Figure 1B:
FIG. 1B illustrates a QR code.

The invention may be used with any optical representation of data, including barcodes. In one embodiment, a barcode is the Universal Product Code (UPC). In another embodiment, a barcode is a two-dimensional barcode, such as, but not limited to, a Quick Response (QR) code.

Barcodes, such as UPC codes, can be scanned using various scanners. For example, a camera or mobile computing devices, such as a cell phone, can be used to capture an image of a UPC. The image data can be processed to determine the number encoded by the UPC. FIGS. 2A-2C are illustrations of a trading interface retrieved based upon a UPC in accordance with an illustrative implementation. A mobile computing device 200 can include a camera. To capture a UPC, the mobile computing device 200 is positioned until the UPC is within a viewfinder 202. Pressing a scan button 204 can capture an image of the UPC code. The image data can be processed by the mobile computing device 200 or sent to a remote computing device. The computing device can process the image to decode the sequence of numbers encoded in the captured UPC. In addition to UPCs, other barcodes can be scanned and processed as is known in the art; for example, matrix barcodes, QR codes, EAN1-3, GS1-128, etc.

Once the sequence of numbers has been decoded, the various components of the UPC, such as, but not limited to, the company prefix 106, the product number 110, etc., can be determined. The company prefix is one example of a company identifier. In one implementation, the company identifier is used to determine a company name associated with the company identifier. In some implementations, the company name identifies a manufacturer. The manufacturer may or may not be a publicly tradable company. For example, the manufacturer may be a separate division of a publicly traded company.

In one implementation, the company name is determined from a trusted database using the company identifier. If a matching company name is found, additional information associated with the company can be determined from the trusted database; for example, one or more companies associated with the company name. In one implementation, the trusted database provides an indication that no further information is required. In this implementation, the information returned from the trusted database is in a format that requires no further processing and can be displayed to a user. In other implementations, the returned company name and/or decoded UPC number can be used to search an untrusted database for additional information.

The decoded UPC number can also be used to look up product related information from the trusted database, such as but not limited to a product name, product description, product image, etc., associated with the UPC. For example, the company identifier along with the product number can be used to determine the product-related information. The product-related information can then be displayed 206 on the mobile computing device 200. As the use of a product number varies by the company, there may not be corresponding product information with a UPC code. To help build a database, a user can be asked to provide information that is used to associate product related information with a UPC. For example, the mobile computing device 200 can ask a user to provide a company name in an input box 210 if a scanned UPC is not associated with product-related information. The user can also be asked for the product name and to take a picture of the product. This information can be sent to a remote computing device and stored in the trusted database and associated with the company identifier. Once the data is stored, future scans of the UPC can result in the product-related information being displayed 206.

As noted above, an untrusted database can be searched using the company identifier to determine a company name. In one implementation, the untrusted database is searched only if company information is not found in the trusted database. In another implementation, the untrusted database is searched for additional information associated with the company. As described in greater detail below, information from the untrusted database can require further processing to ensure that the information is in a usable format. The company name can be used to look up one or more associated company names from the untrusted database. The one or more associated company names can include manufacturers, suppliers, retailers, competitors, etc. Prior to using the company name, the company name can be cleansed. For example, various characters and/or phrases such as, but not limited to commas, articles, notation, generalized text, search text, etc., can be removed from the company name to get a cleansed name. The cleansed name can be used to determine the one or more names that are associated with the company name. Using the associated company names, one or more ticker symbols associated with the associated company names can be determined. In one implementation, the associated company names are cleansed the same way as the company name was prior to determining corresponding ticker symbols.

If the company name is not found in the untrusted database, a user can be asked to provide information related to the scanned UPC code. For example, the user can provide a product name and any known company information. This information can then be added to the trusted database for use with future scans of the same UPC code.

In some implementations, before the one or more associated company names are used to determine one or more ticker symbols, the associated company names are processed to determine a probable or expected relevance to the user. For example, if there are more than a predetermined number of associated company names, the most relevant associated company names can be determined. Various known relevancy ranking algorithms can be used, such as, but not limited to, Levenshtein distance, Bipartite, etc.

Once the ticker symbols are determined, the ticker symbols, the company name, and/or the one or more associated company names can be added to a watch list associated with a user using an "add to watch list" button, such as 208 and 212. Prior to adding a ticker symbol to a watch list, user verification can take place. For example, the user can provide a username and password, which can be verified, prior to adding a ticker symbol to a user's watch list.

In another implementation, the location of the user can also be associated with a company that can be added to the user's watch list. For example, the location of the user can be determined by GPS or by receiving the longitudinal and latitudinal coordinates of the user's mobile computing device. The location of the mobile computing device can be used to determine in what store the user is likely located, or what stores are nearby. For example, the location can be used to query a data store to determine what stores are near a location of the user. A store name can be used to determine a one or more associated company names associated with the store. The associated companies can include manufacturers, suppliers, retailers, competitors, the company name associated with a product, etc. The store name and the associated company names can be used to determine a set of ticker symbols associated with the companies. The user can then have the option of adding one or more of the ticker symbols to his watch list. Accordingly, in another implementation a store's name can be used to determine a set of one or more companies and ticker symbols associated with the store, which can be added to the user's watch list.

FIGS. 3A-3C are illustrations of a trading interface received based upon a UPC in accordance with an illustrative implementation. The watch list is a list of one or more ticker symbols that can include associated data 304. For example, the watch list can provide a current price, a change in price, a company name, a bid price, an ask price, etc. associated with each ticker symbol in the watch list. An edit button 302 allows a user to add and/or remove ticker symbols from the watch list. The user can also trade and/or receive data related to a ticker symbol from the watch list. For example, a user can request to trade an instrument associated with a ticker symbol. As another example, a user can request information about a stock price associated with a ticker symbol. The information can include price information 308, such as, but not limited to a current price, a change in price, a percentage change in price, etc. In addition, trading data 310 can also be provided. Trading data 310 can include, but is not limited to a bid price, an ask price, a daily low, a daily high, a number of shares offered at the bid price, a number of shares offered at the ask price, an open price, a close price, a volume, a profit to earnings ratio, etc. A user can trade an instrument associated with a company using a trade button 306. For example, a user can buy and/or sell stock, options, bonds, etc. of a company. In one implementation, the user can place an order to buy or sell a number of shares, options, or bonds of the company. A remote server can receive and process this order.

In addition to trading an instrument associated with a company, a user can request other information associated with the company from the watch list. For example, the user can request news about a company or charts about a company. In one implementation, a chart 312 can include a company's stock price over a period of time.

Figure 4:
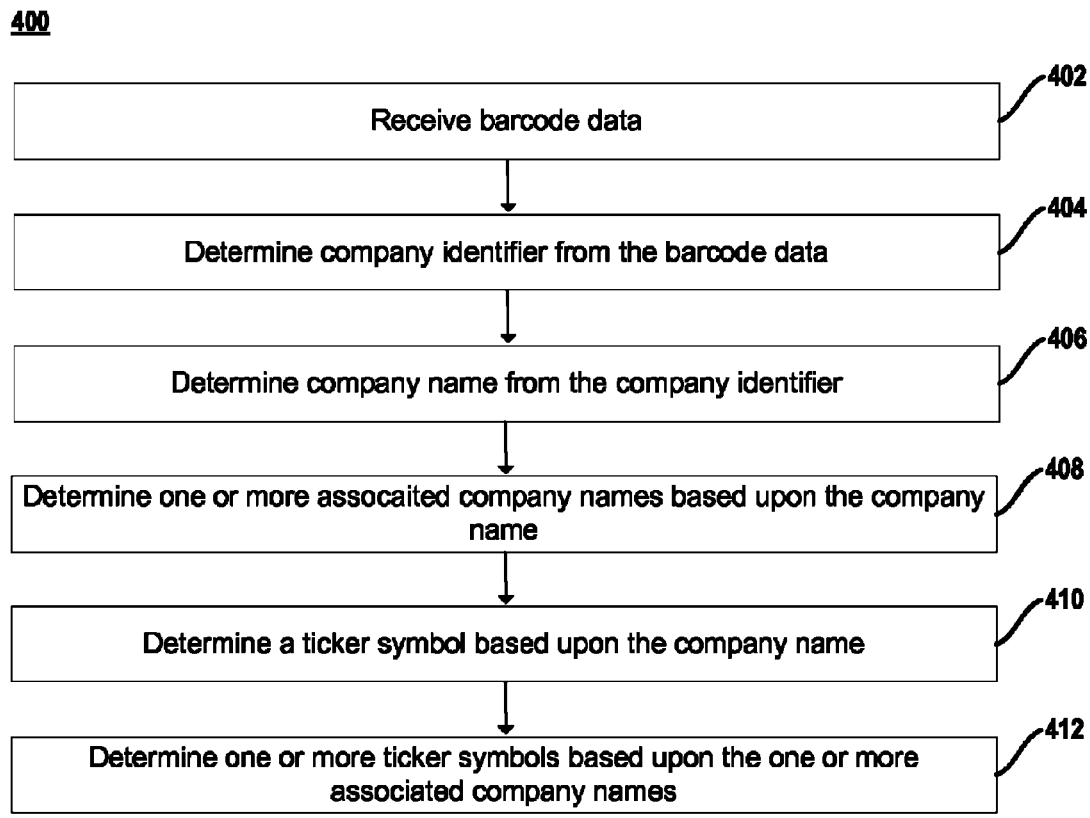
FIG. 4 is a flow diagram of a process for retrieving a trading interface based upon a UPC in accordance with an illustrative implementation.

As described above, UPC data can be used to determine one or more ticker symbols associated with the UPC data. FIG. 4 describes one process for determining one or more ticker symbols from the UPC data. FIG. 4 is a flow diagram of a process for retrieving a trading interface based upon a UPC in accordance with an illustrative implementation. The process 400 can be implemented on a computing device. In one implementation, the process 400 is encoded on a computer-readable medium that contains instructions that, when executed by a computing device, cause the computing device to perform operations of process 400.

Barcode data is received (402). For example, UPC data can be received at a mobile computing device. In one implementation, the mobile computing device can capture an image of a UPC symbol. The image can be processed by the mobile computing device or sent to a remote computing device. The image is processed to determine UPC data, that is received by the mobile computing device. A company identifier is determined from the barcode data (404). For example, the company identifier can include the first 6 digits of the UPC. Using the company identifier, a company name associated with the company identifier is determined (406). In one implementation, a data store contains a mapping from a company identifier to a company name. In some implementations, the company name is cleansed as described above. The company's name is used to determine one or more associated company names (408). The one or more associated company names can include one or more manufacturers, suppliers, retailers, customers, competitors, etc. In some implementations, there are no associated company names. As described above, the one or more associated company names are cleansed in the same manner as the company name. The company name can be used to determine a ticker symbol associated with the company name (410). In addition, one or more ticker symbols can be determined from the one or more associated company names (412). These ticker symbols can be displayed to a user, and the user can add one or more ticker symbols to his watch list. Once a ticker symbol is added to the watch list, the watch list can provide the user with news, charts, financial information, historical data, any other related information that may be supplied by various financial exchanges, any other information relevant to the user, etc., related to the ticker symbols within the watch list. In addition, the user can trade instruments associated with any ticker symbol from the watch list.

In another implementation, a server can process barcode data, such as UPC data, to determine a ticker symbol. For example, a mobile computing device can take a picture of a UPC. The image of the UPC can be transmitted to a remote server. The remote server can process the image data to decode the sequence of numbers encoded in the captured UPC. The server can then use local or remote data stores to look up a company name based on the company prefix of the UPC, and then determine one or more associated company names. The company name and the one or more associated company names can be used to determine one or more ticker symbols. The remote server can send the ticker symbols and other data such as, but not limited to the company name, one or more associated company names, the one or more ticker symbols, etc., to the mobile computing device. In another implementation, the mobile computing device can process the UPC data to determine the one or more ticker symbols.

In another implementation, a QR code can be used to determine one or more companies and ticker symbols associated with the QR code. As an example, a QR code can be located on a business card or advertisement. A mobile computing device can capture an image of the QR code. The mobile computing device or a remote server can decode QR data encoded in the QR code. QR data can include a company identifier, such as, but not limited to, a company prefix, a uniform resource locator (URL), contact information, etc. The decoded QR data can be used to determine one or more company names. For example, a company identifier can be used to determine a company name as described above. A URL can be mapped to one or more companies using a database that maps URLs to company names. URLs can also be used to determine one or more company names using any available registrar information. For example, the registrar information associated with the URL can be retrieved from a remote server, e.g., a whois server. This information can be parsed to determine one or more company names. In one implementation, a portion or all of the registrar information can be cleansed in a similar manner as a company name as described above. Contact information can also be used to determine one or more company names. For example, the QR data can include an email address and/or a company name. A domain of the email address can be used to lookup the company name based upon a registrar information or a URL to company name mapping data store. Once the one or more company names are determined, the one or more company names can be used to determine one or more associated companies, such as manufacturers, affiliates, subsidiaries, competitors, retailers, suppliers, etc. One or more ticker symbols of the one or more company names and the one or more associated company names can be determined using the one or more company names and the one or more associated company names. A user can be provided with a list of these company names, associated company names, and ticker symbols. The user can select any of the names or ticker symbols to add to his watch list.

Figure 5:
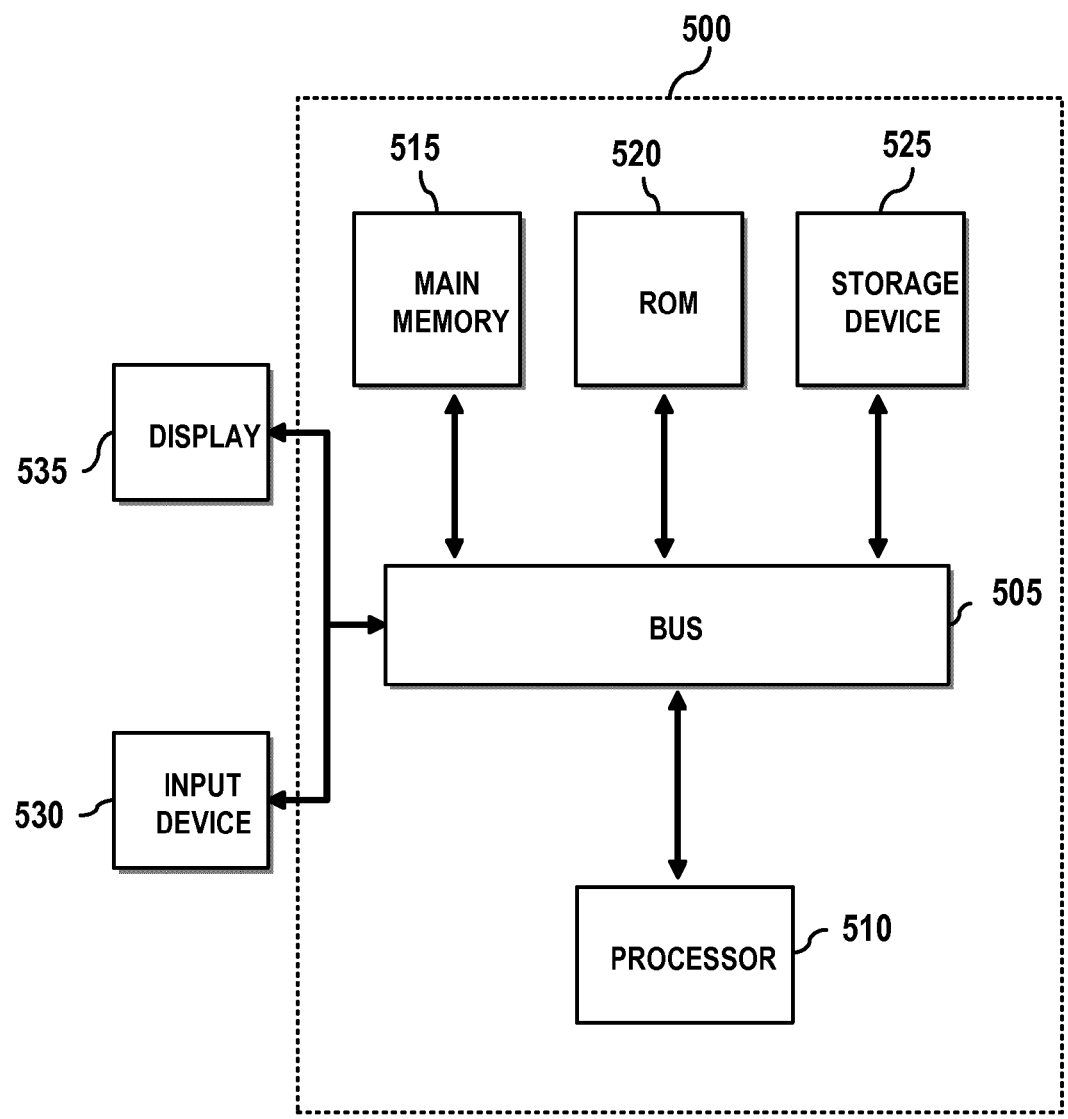
FIG. 5 is a block diagram of a computer system in accordance with an illustrative implementation.

FIG. 5 is a block diagram of a computer system in accordance with an illustrative implementation. The computer system or computing device 500 can be used to implement cell phones, clients, servers, cloud computing resources, etc. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515.

Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more non-transitory computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving barcode data including a company identifier;
determining the company identifier from the barcode data;
determining a company name based upon the company identifier;
determining, using a processor, one or more associated company names associated with the company name based upon the company identifier;
determining a first ticker symbol based upon the company name;
determining a location of a user; and
determining one or more ticker symbols based upon the one or more associated company names and the location of the user.

2. The method of claim 1, further comprising adding the first ticker symbol to a watch list associated with a user.

3. The method of claim 2, further comprising providing the watch list to a remote computing device.

4. The method of claim 3, further comprising receiving a trade order of the first ticker symbol.

5. The method of claim 1, further comprising:
capturing an image of a barcode; and
processing the image of the barcode to generate the barcode data.

6. The method of claim 1, further comprising determining an updated company name by removing articles and commas from the company name prior to determining the one or more associated company names, wherein the one or more associated company names are determined based upon the updated company name.

7. The method of claim 1, further comprising determining updated one or more company names by removing articles and commas from each of the one or more associated company names prior to determining the one or more ticker symbols, wherein the one or more ticker symbols are determined based upon the updated one or more company names.

8. The method of claim 1, further comprising sending related information based upon the first ticker symbol.

9. The method of claim 1, further comprising determining a product associated with the barcode data.

10. The method of claim 9, further comprising:
requesting product data based upon determining no product data is available;
receiving the product data; and
storing the received product data associated with the barcode data.

11. The method of claim 1, further comprising determining a relevancy of each of the one or more associated company names.

12. A non-transitory computer-readable medium having instructions stored thereon, the instructions comprising:
instructions to receive barcode data including a company identifier;
instructions to determine the company identifier from the barcode data;
instructions to determine a company name based upon the company identifier;
instructions to determine one or more associated company names associated with the company name based upon the company name;
instructions to determine a first ticker symbol based upon the company name; and
instructions to determine one or more ticker symbols based upon the one or more associated company names.

13. The non-transitory computer-readable medium of claim 12, further comprising instructions to add the first ticker symbol to a watch list associated with a user.

14. The non-transitory computer-readable medium of claim 13, further comprising instructions to provide the watch list.

15. The non-transitory computer-readable medium of claim 14, further comprising instructions to receive a trade order of the first ticker symbol associated with the user.

16. The non-transitory computer-readable medium of claim 15, further comprising:
instructions to capture an image of a barcode; and
instructions to process the image of the barcode to generate the barcode data.

17. The non-transitory computer-readable medium of claim 12, further comprising:
instructions to determine a product associated with the barcode data;
instructions to request product data based upon determining no product data is available;
instructions to receive the product data; and
instructions to store received product data associated with the barcode data.

18. The non-transitory computer-readable medium of claim 12, the instructions further comprising:
instructions to determine a location of a user, wherein the instructions to determine one or more ticker symbols is based upon the location of the user.

19. The non-transitory computer-readable medium of claim 12, the instructions further comprising:
instructions to determine an updated company name by removing articles and commas from the company name prior to the instructions to determine the one or more associated company names; and
instructions to determine the one or more associated company names associated with the company name based upon the updated company name.

20. The non-transitory computer-readable medium of claim 12, the instructions further comprising:

instructions to determine updated one or more company names by removing articles and commas from each of the one or more associated company names prior to the instructions to determine the one or more ticker symbols; and instructions to determine the one or more ticker symbols based upon the updated one or more company names.

21. The non-transitory computer-readable medium of claim 12, the instructions further comprising:

instructions to determine a relevancy of each of the one or more associated company names.

22. A system comprising:

one or more processors configured to receive barcode data including a company identifier;

determine the company identifier from the barcode data;

determine a company name based upon the company identifier;

determine an updated company name by removing articles and commas from the company name;

determine one or more associated company names associated with the company name based upon the updated company name;

determine a ticker symbol based upon the company name; and determine one or more ticker symbols based upon the one or more associated company names.

23. The system of claim 22, wherein the one or more processors are further configured to add the first ticker symbol to a watch list associated with a user.

24. The system of claim 23, wherein the one or more processors are further configured to provide the watch list.

25. The system of claim 24, wherein the one or more processors are further configured to receive a trade order of the first ticker symbol associated with the user.

* * * * *